(12) United States Patent
Yuyama et al.

(10) Patent No.: US 7,592,553 B2
(45) Date of Patent: Sep. 22, 2009

(54) MEDICINE WEIGHING DEVICE

(75) Inventors: Hiroyuki Yuyama, Toyonaka (JP); Keita Yasuoka, Toyonaka (JP); Akitomi Kohama, Toyonaka (JP); Atsushi Kawano, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/885,586

(22) PCT Filed: Mar. 10, 2006

(86) PCT No.: PCT/JP2006/304715

§ 371 (c)(1),
(2), (4) Date: Dec. 13, 2007

(87) PCT Pub. No.: WO2006/095850

PCT Pub. Date: Sep. 14, 2006

(65) Prior Publication Data
US 2008/0135309 A1 Jun. 12, 2008

(30) Foreign Application Priority Data
Mar. 11, 2005 (JP) .............................. 2005-069504
Feb. 14, 2006 (JP) .............................. 2006-036749

(51) Int. Cl.
*G01G 19/00* (2006.01)
*A61J 3/00* (2006.01)
(52) U.S. Cl. ................... 177/25.13; 177/25.19
(58) Field of Classification Search ... 177/25.11–25.17, 177/25.19
See application file for complete search history.

(56) References Cited

U.S. PATENT DOCUMENTS

| | | | | |
|---|---|---|---|---|
| 4,840,239 A * | 6/1989 | Slagg | ................. | 177/25.14 |
| 6,191,371 B1 * | 2/2001 | Olberg et al. | ............. | 177/25.14 |
| 6,858,808 B1 * | 2/2005 | Buhler et al. | ............. | 177/25.13 |
| 7,057,117 B2 * | 6/2006 | Baitz et al. | ................. | 177/25.15 |

FOREIGN PATENT DOCUMENTS

| | | |
|---|---|---|
| JP | 60-183527 | 9/1985 |
| JP | 63-246622 | 10/1988 |

(Continued)

*Primary Examiner*—Randy W Gibson
(74) *Attorney, Agent, or Firm*—Wenderoth, Lind & Ponack, L.L.P.

(57) ABSTRACT

A medicine weighing device that includes, not only a weighing function, but also an inspection function. The medicine weighing device has a compact structure capable of displaying a weighed value and an inspection result on the same screen, and which can execute inspection according to the input state of weighing conditions. Accordingly, the medicine weighing device is structured to include, in a device main body 1, a weighing device (2) for weighing medicine to be dispensed, a display device (3) for displaying a weighed value and weighing conditions, an input device (3) for inputting the weighing conditions, a storage device (11) for storing an inspection program and medicine data, and a control mechanism (5) for calculating a recommended dose by executing the inspection program stored in the storage medium (11) based only on the weighing conditions which can be inputted by the input device among the weighing conditions, and displaying the calculated recommended dose and the weight of the medicine weighed by the weighing device (2) on the display (3).

12 Claims, 13 Drawing Sheets

FOREIGN PATENT DOCUMENTS

| | | |
|---|---|---|
| JP | 5-23061 | 3/1993 |
| JP | 10-9938 | 1/1998 |
| JP | 2002-282341 | 10/2002 |
| JP | 2004-157579 | 6/2004 |
| JP | 2004-208846 | 7/2004 |
| WO | 03/103564 | 12/2003 |

* cited by examiner

Fig.5

Dispensing staff input screen

Select dispensing staff

| Ichiro Yuyama | |
| Jiro Yuyama | |
| Saburo Yuyama | |
| | |
| | |

Cancel

Fig.6

Inspection operation screen

Onedy II | Prescription No. | 05/11/21 14:06

Number of days | Number of packs | Age | Body weight | Menu

| Medicine name | Actual measurement value |
| --- | --- |
| | |
| | |
| | |
| | |

Total

Print present | | Input |

Password input screen

Weighing screen

Fig. 9

Number of days select screen

| One d y II | Prescription No. | 05/11/21 14:22 |

Number of days | Number of packs | Age | Body weight | Menu

Medicine name | Actual measurement value

Select number of days 3 days | 7 days | 14 days
21 days | Single use | External
Input number of days | Clear | Cancel

Fig. 10

Weighing confirmation screen

① (Toxic) ascorbic acid powder
② ③ ④ ⑤ ⑥
(Reference) 20 year olds  Daily recommended dose (total) : 0.250 g ~ 10.000 g
⑦
Notice different standard!?

For seven days   Three times a day   20 year olds   6 0 K g

Daily dose         1 . 1 2 3     g

Target total amount   7 . 8 6 1   g

Recommended dose register screen

| Medicine name | Ulcerlmin fine granule | | | | | |
|---|---|---|---|---|---|---|
| Age lower limit / upper limit | | Division | Contra indication | One time lower limit | One time upper limit | Daily lower limit | Daily upper limit |
| 0.00 | 14.99 | Kg | -- | 0.500 | 1.000 | 1.000 | 3.000 |
| 15.00 | 999.00 | Total | -- | 1.000 | 2.000 | 2.000 | 6.000 |

Reload  Delete  Register  Return

Fig. 12

| One day II | Taro Yuyama | 05/11/21 14:47 |
|---|---|---|
| Single use | 14 times | 72:10 years old | Body weight | Menu |

| Medicine name | Actual measured value |
|---|---|
| Codeine phosphate powder (10mg/g) | 23.7 g |

Displayed medicine

Wrong medicine

Excipient processing method register screen

| Age | Division | Reference amount | | Fixed excipient amount | |
|---|---|---|---|---|---|
| | | One pack | Two or more packs | One pack | Two or more packs |
| 1.99 | Reference | 1.00 | 0.80 | 0.00 | 0.00 |
| 14.99 | Fixed | 0.70 | 0.60 | 0.50 | 0.30 |
| 999.00 | | | | | |

Fig. 16

Excipient screen

Lactose

100mg   Stabilize  L/AL  RANGE

Target value : 2.7 g 3.14 g

Cancel   Tare  0   Determine

MEDICINE WEIGHING DEVICE

BACKGROUND OF THE INVENTION

1. Technical Field

The present invention relates to a medicine weighing device for weighing and inspecting medicine when medicine such as powder medicines and liquid medicines is prescribed in hospitals, dispensing pharmacies and the like.

2. Description of the Related Art

Conventionally, there has been known a device for not only weighing medicine based on prescription slips but also inspecting whether or not a weighed value is appropriate as a recommended dose when powder medicine and the like are dispensed (see, e.g., JP 2004-208846 A; and JP 2002-282341 A).

SUMMARY OF THE INVENTION

1. Problems to be Solved

The conventional device requires an inspection system (e.g., notebook-sized personal computer) including a display means and a control means in addition to the weighing device, and this causes dispensing space to be decreased. The weighing device and the inspection system are connected via a communication line, and after a weighing by the weighing device result is set, the result is transmitted to the inspection system. It is necessary, therefore, to pay attention to whether data transmission is appropriately executed or not (e.g., communication failure). Further, since the weighed value and the inspection check result are displayed on different devices, dispensing staffs need to dispense medicine while comparing both the displays, which causes poor workability. Moreover, since it is prohibited by the Measurement Law to output unstable values weighed by scales into external equipment, some time lag is inevitably generated between the time to display the weighed value on the weighing device and the time to display the weighed value on the display means, which gives annoyance to the dispensing staffs. This also may cause the dispensing staffs to miss the check result displayed on the display means. Further, there is also a problem in which the dispensing operation is not possible unless all the weighing conditions are inputted at the time of inspection.

It is a primary object of the present invention to provide a medicine weighing device which includes not only a weighing function but also an inspection function, which has a compact structure capable of displaying a weighed value and an inspection result on the same screen, and which can execute inspection according to the input state of weighing conditions.

2. Means for Solving the Problems

As a means to solve the aforementioned problems, there is provided, in the present invention, a medicine weighing device including, in a device main body, a weighing means for weighing a medicine to be dispensed, a display means for displaying a weighed value and weighing conditions, an input means for inputting the weighing conditions, a storage means for storing medicine data including the weighing conditions of the medicine to be dispensed and a recommended dose to satisfy the weighing conditions, and a control means for calling the recommended dose stored in the storage means based only on the weighing conditions which can be inputted by the input means among the weighing conditions, and displaying the recommended dose and a weighed value of the medicine to be dispensed which was weighed by the weighing means on the display means while executing recommended dose check.

According to the structure, even if all the weighing conditions are not inputted, an applicable recommended dose among those stored in the storage means is called based on the inputted weighing conditions and is compared with the weighed value of the medicine to be dispensed which was weighed by the weighing means so that the recommended dose check can be performed. Since all the weighing means, the input means, the storage means, the display means and the control means are provided in the main body of the device, a compact structure can be achieved. Further, since the recommended dose and the weighed value can be displayed on the display means, it becomes easy to see these values and this can enhances the workability compared to the conventional device in which these values are displayed in two separated devices. It is preferable to structure the storage means so as to allow mounting and dismounting because this allows various settings in conformity to contents to be stored.

It is preferable to include a medicine to be dispensed determination means for determining the medicine to be dispensed, wherein upon determination of the medicine to be dispensed by the medicine to be dispensed determination means, the control means allows weighing by the weighing means.

Consequently, the weighing process can be started only when the medicine to be dispensed is determined by the medicine to be dispensed determination means, which makes it possible to prompt dispensing staffs to confirm the medicine to be dispensed and to prevent dispensing errors from occurring.

It is to be noted that the medicine to be dispensed determination means may have a structure allowing reading of a detection target section stuck to the container, which contains medicine to be dispensed, such as barcode readers and a structure involving direct input through keyboards and touch panels.

The storage means may store, as the medicine data, a total daily amount of the medicine which can be administered to adults, the medicine stipulated by the medicine name, as an adult total dose, and when no weighing condition is inputted by the input means, the control means may display the adult total dose stored in the storage means as a reference value together with the weighed value weighed by the weighing means on the display means.

The storage means may store a daily recommended dose of the medicine to be dispensed as the medicine data, and when number of prescription days of the medicine to be dispensed is inputted as a weighing condition by the input means, the control means may divide the weighed value by the weighing means by the number of prescription days to calculate a daily prescribed dose and compares the resultant daily prescribed dose with the daily recommended dose of the medicine to be dispensed stored in the storage means so as to execute recommended dose check.

The storage means may further store recommended one-time dose of the medicine to be dispensed as the medicine data, and when number of packs is further inputted as a weighing condition by the input means, the control means may divide the daily prescribed dose by the number of packs to calculate one time prescribed dose and compares the resultant prescribed dose with the recommended one-time dose stored in the storage means so as to execute recommended dose check.

The storage means may store data allowing calculation of a recommended dose by body weight as a weighing condition of the medicine data, and when a body weight is inputted by the input means as a weighing condition, the control means may calculate a recommended dose based on the body weight with reference to the data stored in the storage means and compares the resultant recommended dose with a weighed value by the weighing means so as to execute recommended dose check.

The storage means may store a recommended dose by age as a weighing condition of the medicine data, and when the age is inputted as a weighing condition by the input means, the control means may call the recommended dose stored in the storage means based on the age and compares the resultant recommended dose with a weighed value by the weighing means so as to execute recommended dose check.

The storage means stores recommended doses corresponding to different weighing conditions as described above, and therefore even if no weighing condition is inputted or only a part of the weighing conditions is inputted, the recommended dose check can be executed by comparing the weighed value by the weighing means with the recommended dose determined depending on the input state.

It is preferable that the storage means store a reference amount and an excipient processing method as excipient processing conditions and that when a weighed value by the weighing means does not reach the reference amount stored in the storage means, the control means perform excipient processing in accordance with the excipient processing method.

According to the structure, it becomes possible to automatically determine whether or not the medicine should be treated as an excipient medicine, so that it becomes possible to prevent excipient processing from being forgotten and to perform appropriate excipient processing.

It is preferable that the medicine to be dispensed be identified by reading a reading target section provided on a container for containing medicine with read means and that the control means identify the medicine to be dispensed not only when the medicine is a registered medicine stored as the medicine data in the storage means but also when the medicine is an unregistered medicine obtained through a connected server.

The control means can temporarily register an unregistered medicine which is not registered in the server for identification of the medicine to be dispensed.

As a means to solve the aforementioned problems, there is provided, in the present invention, a medicine weighing device including, in a device main body, a weighing means for weighing medicine to be dispensed, and a display means for displaying an inspection operation screen including at least a medicine name, wherein a screen of the display means can be changed to either a target value to be weighed with the weighing means or an actual measurement value weighed with the weighing means, and both the values are displayed in an identifiable way.

With the structure, display in a limited range can be achieved effectively without causing mistakes. The target value and the actual measurement value may be identified by, for example, changing the background color or the color of characters.

It is preferable to further include a storage means for storing a medicine master composed of at least the medicine to be dispensed and a recommended dose of the medicine to be dispensed, a recommended dose determination means for determining whether or not the target value is appropriate based on the recommended dose in the medicine master stored in the storage means, and a display control means for instructing the display means to display an error message when it is determined by the recommended dose determination means that a standard value is not appropriate.

With the structure, it becomes possible to determine whether or not a target value is appropriate before weighing with the weighing means is started in actuality, so that the contents of a prescription slip can be rechecked and error, if any, can be notified.

It is preferable that the target value be composed of a daily dose and a total dose for number of prescription days and that the display control means changes the inspection operation screen to a weighing confirmation screen to display only the daily dose, determines whether or not a manually inputted total dose is appropriate when the total dose is manually inputted, changes the screen to a weighing screen if the manually inputted total dose is appropriate, and displays an error message if the manually inputted total dose is not appropriate.

With the structure, the dispensing staffs are required to calculate the total dose from the daily dose and manually input the calculated result, which prevents mechanical processing and allows occurrence of errors to be suppressed.

According to the invention, even if all the weighing conditions are not inputted, recommended dose check can be performed based on an inputted weighing condition. Since all the weighing means, the input means, the storage means, the display means and the control means are provided in the main body of the device, compact structure can be achieved. Further, since the recommended dose and the weighed value can be displayed on the display means, it becomes easy to see these values and this can enhance the workability compared to the conventional device in which these values are displayed in two separated devices.

BRIEF DESCRIPTION OF THE DRAWINGS

FIG. 1(a) is a perspective view showing a medicine weighing device according to the present embodiment, while FIG. 1(b) is a partially enlarged view showing a part (bearing section) of a windshield case;

FIG. 5 is a view showing a dispensing staff input screen displayed in a display section in FIG. 1;

FIG. 6 is a view showing an inspection operation screen displayed in the display section in FIG. 1;

FIG. 9 is a view showing a number of days selection screen displayed in the display section in FIG. 1;

FIG. 10 is a view showing a weighing confirmation screen displayed in the display section in FIG. 1;

FIG. 11 is a view showing a recommended dose register screen displayed in the display section in FIG. 1;

FIG. 12 is a view showing the inspection operation screen displayed in the display section in FIG. 1 with a warning message indicating that the medicine does not match;

FIG. 15 is a view showing an excipient processing method register screen displayed in the display section in FIG. 1;

FIG. 16 is a view showing an excipient processing screen displayed in the display section in FIG. 1;

FIG. 17 is a view showing a medicine master register screen displayed in the display section in FIG. 1;

FIG. 18 is a view showing a detailed register screen changed from the screen in FIG. 17;

FIG. 19 is a view showing a phial register screen displayed in the display section in FIG. 1;

FIG. 20 is a view showing the inspection operation screen in FIG. 6 with a pulled-down sub menu displayed by operation of a menu button;

FIG. 21 is a view showing a replenishment operation screen displayed in the display section in FIG. 1;

REFERENCE NUMERAL

Figure 1:
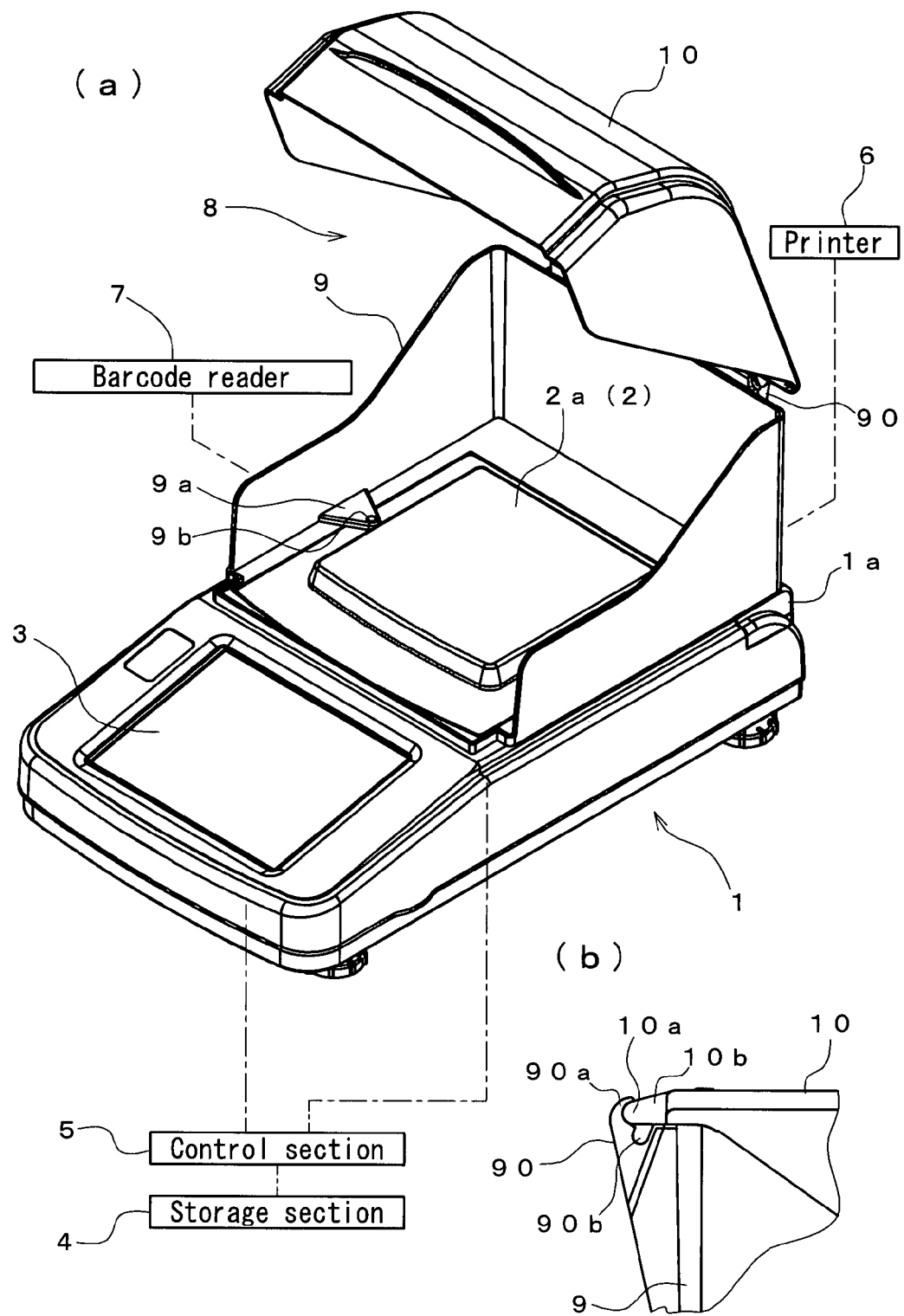

1: device main body
2: weighing section (weighing means)
3: display section (display means)
4: storage section
5: control section (control means)
6: printer
7: Barcode reader
8: windshield case
9: frame body
10: cap body
11: storage medium (storage means)
12: speaker
13: scale unit
14: parallel circuit
15: force coil
16: current-voltage conversion circuit
17: AD conversion circuit
18: main substrate
19: CPU
20: memory circuit
21: communication control circuit
22: sound circuit
23: display circuit

DETAILED DESCRIPTION OF THE INVENTION

Embodiments of the invention will now be described with reference to the accompanying drawings.

(Structure)

FIG. 1 shows a medicine weighing device according to the present embodiment. The medicine weighing device is mainly composed of a weighing section 2, a display section 3, a storage section 4, and a control section 5 in a device main body 1, with a printer 6 and a barcode reader 7 connected thereto.

The device main body 1 is structured from a box-like casing, with a windshield case 8 mountable on the upper surface of its rear section.

The windshield case 8 is for eliminating an influence of an ambient air flow on medicine mounted on a scale table 2a. As shown in FIG. 1(a), the windshield case 8 is composed of a square frame body 9 and a cap body 10 for opening and closing an upper open section of the frame body 9. The front section of the frame body 9 except a lower end portion is removed so that medicine or a tray carrying the medicine can easily be taken in and out from the front side. The side surface of the frame body 9 is formed so as to be lower in the front side so that a medicine and the like can be taken in and out from the side direction. Moreover, an extending section 9a formed in the lower-end central section on the lateral surface has a protrusion 9b placed downward, so that upon engagement with a hole (not shown) formed on the upper surface of the device main body 1, the windshield case 8 can be aligned with the device main body 1. A bearing 90 is placed on the upper section of the rear surface of the frame body 9 as shown in FIG. 1(b). The bearing 90 has a first support section 90a for rotatably supporting a spindle 10a of the cap body 10 and a second support section 90b for maintaining the cap body 10 in an open state with respect to the frame body 9 by obliquely supporting the spindle 10a. The spindle 10a, which has a plate-like section 10b formed so as to obliquely protrude from both end portions, is rotatably supported by the first support section 90a of the bearing 90, and the cap body 10 is maintained in an inclined state upon engagement between the plate-like section 10b and the second support section 90b of the bearing 90.

Since the cap body 10 is maintained in a half-opened state inclined in relation to the frame body 9 by the second support section 90b of the bearing 90 supporting the plate-like section 10b, weighing can be performed while eliminating an influence of ambient air flow in this half-opened state. In the case where the influence of the air flow cannot be eliminated in the half-opened state, then weighing can be performed in the closed state.

A detachable cover 1a is provided on the rear upper surface of the device main body 1, and when the cover 1a is detached, there is a mounting chamber in which a storage medium 11 constituting the storage means according to the present invention can be mounted and dismounted. Various media such as USB memories, memory cards and discs can be used as the storage medium 11. Herein used is a USB memory, which is mounted on or dismounted from an USB port exposed to the mounting chamber. A detachable cover (not shown) is also provided on the rear surface of the device main body 1, and when the cover is detached, there is a space in which a battery cell can be mounted and dismounted. The battery cell supplies power for use at the time when the power supply of an internal clock serving as a basis of weighing time recording is turned off. Thus, without disassembling the device main body 1 (without any problem in terms of Measurement Law), the storage medium 11 and the battery cell can be replaced. It is to be noted that consumption of the power supply from the battery cell can be curtailed by putting a switch (not shown) placed on the side surface of the device main body 1 in the ON state for switching the power supply to an AC power supply. Displaying the remaining amount of the battery cell and notifying the low amount state with a buzzer and the like make it possible to prevent occurrence of failures such as recorded data troubles caused by erroneous display of the time in the internal clock due to battery shutoff.

The storage medium 11 stores various information other than the information stored in the later-described storage section 4. In the storage medium 11, programs and medicine data relating to an inspection function are stored.

Examples of the medicine data include data relating to medicines (adopted medicines) handled in dispensing pharmacies which use medicine weighing devices, and the data extracted from a medicine master (mother master) stored in a server. The medicine data herein includes data sets of medicine code, medicine name, JAN code, phial (management of lot number, term of validity, inventory and the like), division (dosage form: powdered, liquor, external), specific gravity, medicine type (common drug, toxic drug, narcotic drug, powerful drug, antipsychotic drug, investigational new drug), incompatibility, excipient medicine, and notice. The JAN code is a code (barcode) put on a medicine box supplied by pharmaceutical makers for identifying medicines. These data sets can be automatically imported from the mother master and can also be registered from the later-described display section 3.

It is to be noted that the medicine data stored in the storage medium 11 may be obtained by forming a medicine master (sub-master) for the medicines handled in the medicine weighing device in advance in addition to extracting necessary data from the mother master. Data registration in the mother master or the sub-master can be performed as shown below.

Figures 17, 18, 19:
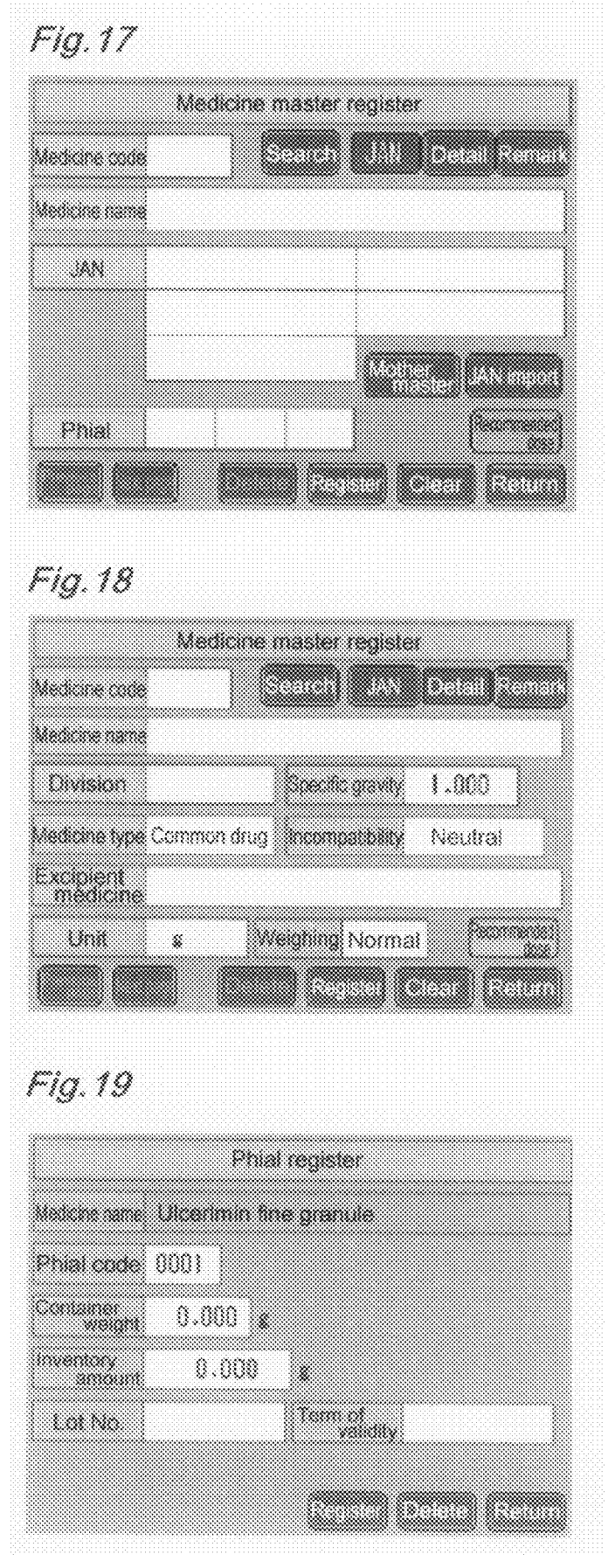

That is, a medicine master register screen shown in FIG. 17 is displayed in the display section 3. On the screen, a medicine code and a medicine name is called from the medicine master (manual input is also available). Then, a JAN code and a phial code to be associated therewith are inputted. The phial code is a code (barcode) put on phials for containing medicine in the case where medicine stored in the medicine box is repackaged into smaller sizes. In this case, one or more JAN codes and phial codes corresponding to the medicine code and the medicine name can be registered. Redundant registration of the JAN code and the phial code among different medicines is not permitted.

In the meanwhile, click-operation of the item "medicine name" changes the display to an item "medicine sound", where sound such as warning sound can be associated with reference to a sound file. Consequently, when medicines are determined during a dispensing operation, it becomes possible to voice medicine names and to output warning sound for sensitive medicines with a later-described speaker 12.

Moreover, click-operation of a detail button changes the screen to a detail register screen in the medicine master shown in FIG. 18. In the detail register screen, division, specific gravity, medicine type, incompatibility and excipient medicine (unit, weighing capacity) can be inputted. In a category column, the dosage form (powdered, liquid, external) is inputted. In a specific gravity column, the specific gravity of the medicine is inputted. In a medicine type column, one selected from common drug, toxic drug, narcotic drug, powerful drug, antipsychotic drug, investigational new drug is inputted. In an incompatibility column, one selected from neutral, acid, alkaline, single is inputted. In an excipient medicine column, a normally used excipient is inputted.

Moreover, click-operation of an item "phial" changes the screen to a phial register screen shown in FIG. 19. In the phial register screen, container weight, inventory amount, lot No. of medicine and term of validity can be registered.

In the division data, in the case of powdered medicine, it is possible to set whether or not checking of one dose (e.g., the weight of powdered medicine administered one time after meal and the like) is performed. Moreover, it is also possible to set so as to permit dispensation of powdered medicine only, dispensation of liquid medicine and external medicine only, or to permit or prohibit simultaneous dispensation of powdered medicine, liquid medicine and external medicine. It is also possible to set so that a warning is outputted when medicine is dispensed under the prohibited conditions.

In the data on the excipient medicine (excipient data), it is so set that excipient processing is executed when a prescribed dose per day or per one pack does not reach a target amount. Moreover, three patterns, "by age", "target amount" and "fixed amount", are set as the excipient processing method. In the excipient processing method "by age", the excipient amount according to age is predetermined. In the excipient processing method by "reference amount", the excipient amount is calculated so that a prescribed dose reaches the target amount. In the excipient processing method by "fixed amount", the amount of an excipient to be mixed into every medicine is constant. This allows weighing of a constant amount of the excipient, which makes the processing easier than that in the excipient processing method by "reference amount". In the excipient data, it is possible to set whether or not the excipient processing is performed automatically. It is to be noted that the excipient processing refers to adding excipients such as lactose, starch and glucose so as to increase the amount of a medicine, to form the medicine into a certain shape or to make the medicine easy to handle.

The speaker 12 is provided on the front section of the device main body 1. The speaker 12 is used to output a warning sound or the like if necessary.

Figure 2:
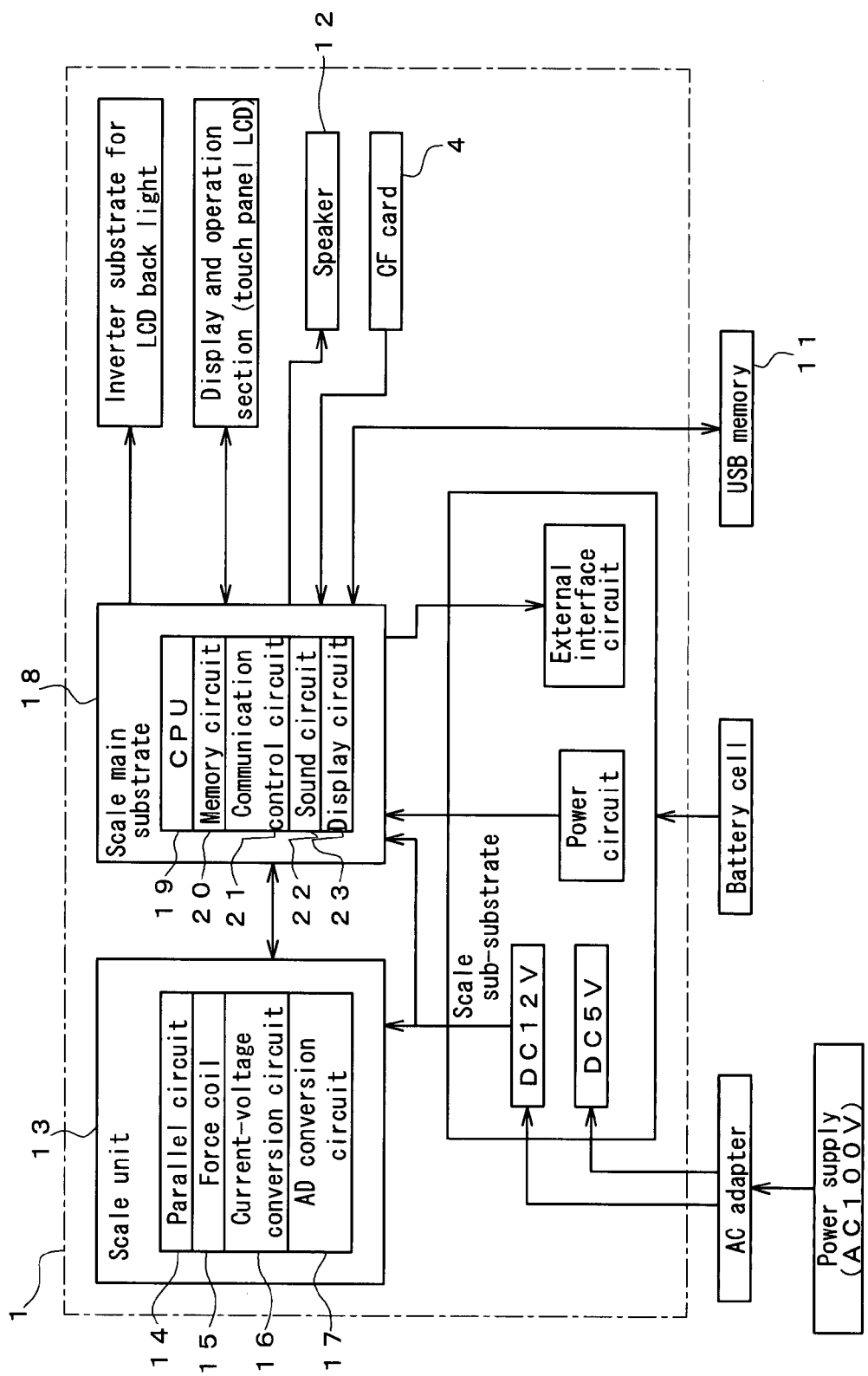
FIG. 2 is a block diagram showing the medicine weighing device according to the present embodiment.

The weighing section 2, which constitutes the weighing means according to the present invention, has a scale unit 13 as shown in FIG. 2. The scale unit 13, which has a parallel circuit 14, a force coil 15, a current-voltage conversion circuit 16, and an AD conversion circuit 17, converts the weight of a medicine mounted on the scale table 2a into a digital signal and outputs it to a main substrate 18 through serial communication.

The display section 3, which is formed from a touch panel, functions as both the display means and the input means according to the present invention. On the display section 3, a dispensing staff input screen shown in FIG. 5 is displayed as an initial screen after startup. The dispensing staff input screen is structured so that a list of registered dispensing staffs is displayed and a dispensing staff is selected from the list. New dispensing staffs can be registered by opening a register screen and also the list can be set to be displayed in ascending order of the registration or the name of dispensing staffs. Upon input of a dispensing staff on the dispensing staff input screen, the screen is changed to an inspection operation screen shown in FIG. 6.

Figure 7:
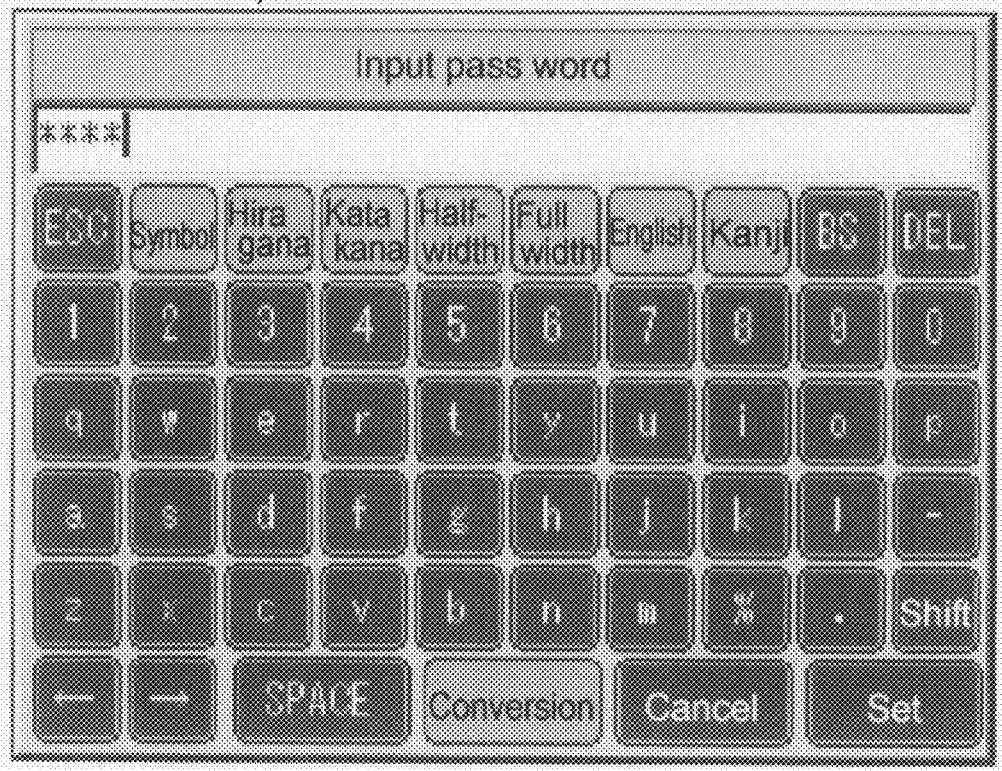
FIG. 7 is a view showing a password input screen display in the display section in FIG. 1.

However, it is desirable that a password input screen shown in FIG. 7 be displayed as an initial screen after startup and that the screen be changed to the inspection operation screen only after an appropriate password is inputted. This makes it possible to prevent the use of the device by the unauthorized third party and to identify the dispensing staff who performs the inspection operation.

On the upper section of the inspection operation screen, various buttons for inputting weighing conditions are displayed, the buttons including "dispensing staff", "prescription No", "number of days", "number of packs", "age", and "body weight" buttons as well as a "menu" button. In the central section of the screen, a list composed of a medicine name and an actual measurement value (weight) of a medicine (medicine to be dispensed) subject to the inspection operation is displayed. In the lower section of the screen, "register", "print" and "cancel" buttons are displayed. It is to be noted that the "input" button is not displayed and is changed to be in a displayed state in the case of failure of the barcode reader 7 as described later.

Figure 8:
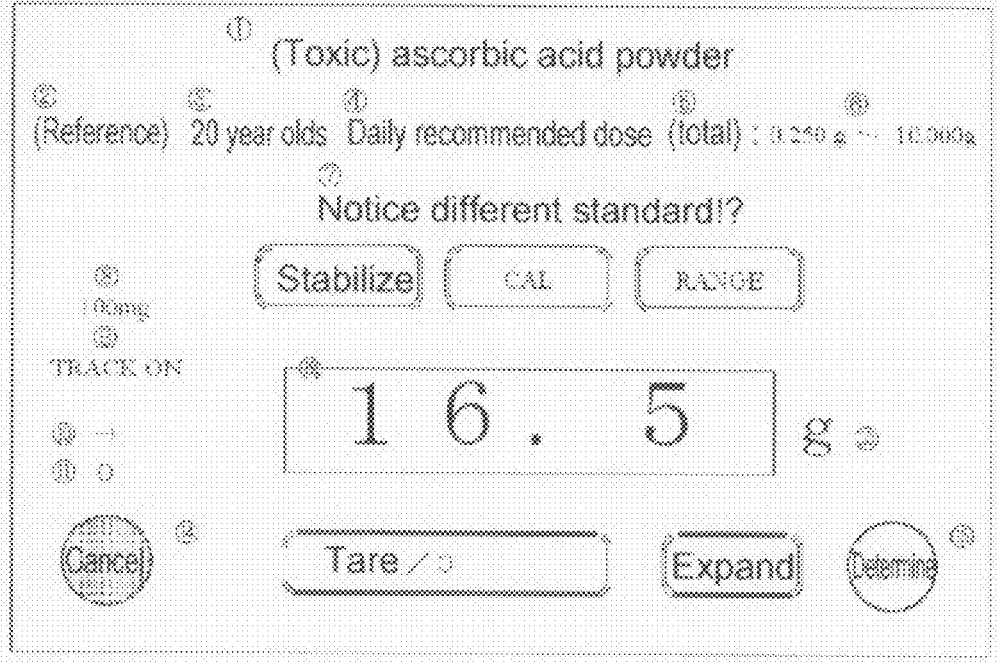
FIG. 8 is a view showing a weighing screen displayed in the display section in FIG. 1.

On the dispensing staff input screen, at least a dispensing staff is inputted, and upon readout of a barcode stuck to a phial by the barcode reader 7, the screen is switched to a weighing screen shown in FIG. 8. However, if the barcode reader 7 should be broken, the screen will not change to the weighing screen but the "input" button is displayed on the inspection operation screen shown in FIG. 6, where the code No. of the medicine can be inputted manually.

On the upper section of the weighing screen, weighing information and inspection information inputted by operation of each button are displayed. The weighing information is composed of items including a medicine name (1: encircled in the drawing), a checking method (2: encircled in the drawing), an age (3: encircled in the drawing), a recommended dose unit (4: encircled in the drawing), a recommended dose display form (5: encircled in the drawing), a recommended dose (6: encircled in the drawing), and a notice (7: encircled in the drawing).

On the lower side of these items, "stabilize", "CAL" and "RANGE" buttons are displayed, and on the lower side of these buttons, a weighing frame (12: encircled in the drawing) for displaying a weighing result is displayed. A target value is displayed on the upper side of the weighing frame for indicating that how much g should be weighed in the end. A weighing bar for indicating the weighing state is displayed on the lower side of the weighing frame. The left end of the weighing bar is zero point (zero-point correction is performed in consideration of the weight of a tray to be mounted), and when medicine to be weighed is mounted on the scale table 2a, an actual measurement bar is displayed from the left end to the right end to a position in response to a weighed value in a color different from the weighing bar. Therefore, the dispensing staff can monitor the progress of the operation while observing the additional amount of the medicine to be weighed. On the left side of the weighing frame, a range (8: encircled in the drawing), tracking on-off (9: encircled in the drawing), a stabilized mark (10: encircled in the drawing), and zero-point display (11: encircled in the drawing) are displayed from the upper side. An item on the right side of the weighing frame is a weighing unit (13: encircled in the drawing). Further, under the weighing frame, buttons representing "tare", "expand", "cancel" (14: encircled in the drawing), and "determine" (15: encircled in the drawing) are displayed.

In the storage section 4, unchangeable data and programs relating to weighing are stored. Herein, a CF (Compact Flash) card is used as the storage section 4.

The control section 5, which constitutes the control means according to the present invention, is structured from the main substrate 18 as shown in FIG. 2. On the main substrate 18, a CPU 19, a memory circuit 20, a communication control circuit 21, a sound circuit 22 and a display circuit 23 are mounted, and the storage medium 11 is in a detachable state. The control section 5, as described later, calls and executes programs from the storage section 4 and from the storage medium 11 and also performs display control of the display section 3 and the like.

The printer 6 is for printing inspection results and the like.

The barcode reader 7 is used to read barcodes stuck to phials for indicating the medicine type. Based on the read barcodes, the medicine data stored in the storage medium 11 is referred, and necessary data therein is read out.

(Operation)

Figure 3:
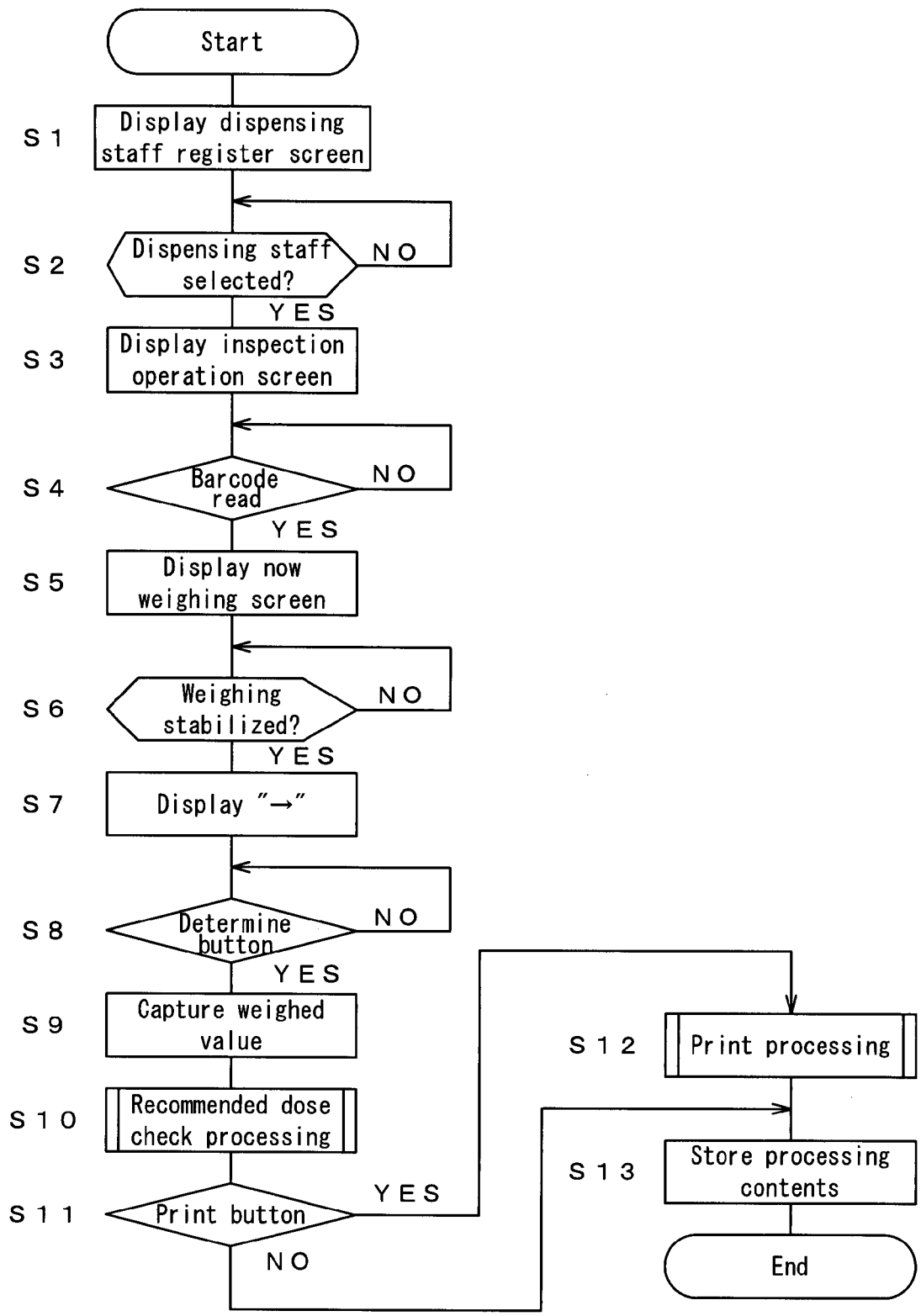
FIG. 3 is a flowchart showing inspection operation according to the present embodiment.

Description is now given of the operation of the medicine weighing device having the above structure according to the flowchart in FIG. 3.

Upon startup, the dispensing staff input screen is displayed (step S1), and upon selection of a dispensing staff who starts to dispense medicine from the list of dispensing staffs registered in advance in the dispensing staff master (step S2), the screen is changed to the inspection operation screen (step S3).

It is preferable that the password input screen be displayed upon startup in the step S1 and if an appropriate password is inputted in the step S2, the screen be changed to the inspection operation screen in the step S3.

On the inspection operation screen, various buttons are displayed in the upper section, and upon touch operation of each button, the screen is changed to a corresponding screen so as to allow inputs of pertinent items. Operable processing herein includes dispensing staff input, prescription No. input, data input, number of days input, number of packs input, age input, body weight input, and maintenance. The medicine subject to weighing is displayed as a list (medicine list) composed of medicine names and target values (or actual measurement values). Further, operating the weighing unit button allows weighing of an arbitrary medicine.

Upon touch-operation of the dispensing staff button, a dispensing staff list is displayed, and dispensing staff input (including alternation of dispensing staffs) can be performed. In the case where the screen is changed to the inspection operation screen by inputting a password on the password input screen as described above, the name of a member of a dispensing staff is automatically displayed.

Upon touch-operation of the prescription No. button, a processing data selection screen is displayed. In this case, when a "sequence" button is touch-operated, the oldest input among prescription data inputs is extracted. When a "patient ID" button is touch-operated, prescription data can be extracted in ascending order (or descending order) of the identification number (ID No.) allotted to every patient. When a "claim check No." button is touch-operated, prescription data can be extracted based on the number (claim check No.) put on a medicine claim check handed to each patient. When a "prescription No." button is touch-operated, prescription data can be extracted based on the number automatically allotted to each prescription slip. When an "unprocessed list" button is touch-operated, a list of prescriptions which have not yet been subjected to inspection is displayed. It is to be noted that the prescription number can also be inputted directly through operation of a numeric keypad without using the prescription No. button.

Upon touch-operation of the date button, date input (date change in this case) can be performed. Unless the data is changed through operation of the date button, today's date and time are displayed on the date button on the inspection operation screen.

Upon touch-operation of the number of days button, it becomes possible to input the number of prescription days, i.e., how many days of the medicine should be dispensed.

Upon touch-operation of the number of packs button, it becomes possible to input the frequency of daily dosing.

Upon touch-operation of the age button, it becomes possible to input the age of the patient. The age input can be made through direct input of the age, or inputting the date of birth in the A.D. or Japanese era designation representation and calculating the age from the current date.

Upon touch-operation of the body weight button, it becomes possible to input the body weight of the patient.

Figures 20, 21:
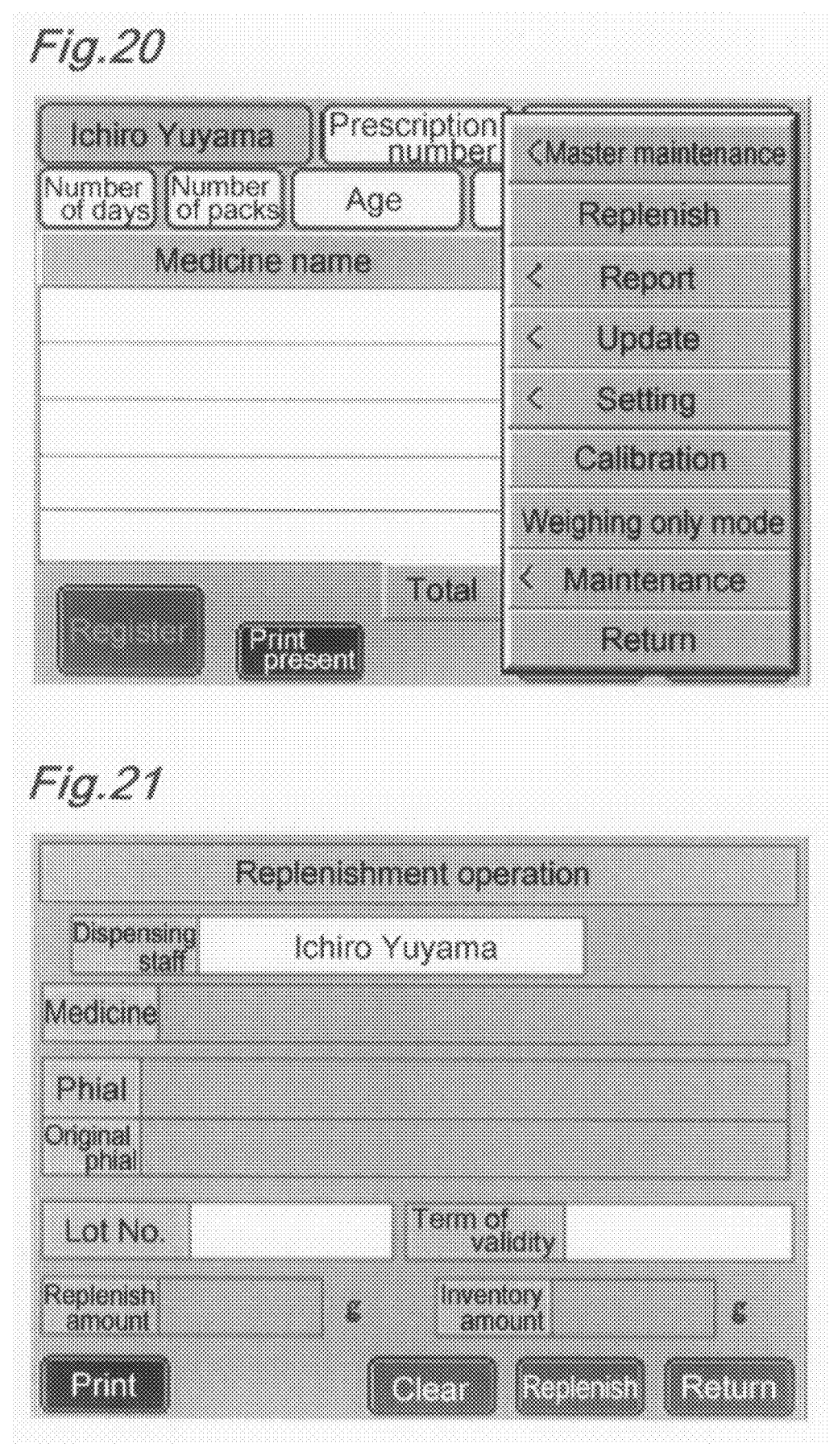

Upon touch-operation of the menu button, a pull-down menu is displayed as shown in FIG. 20. The pull-down menu includes master maintenance, replenish, report, update, setting, maintenance, system link and OFF.

Upon click-operation of the replenish, the replenishment operation screen shown in FIG. 21 is displayed. The replenishment operation screen includes columns of dispensing staff, medicine, phial, original phial, lot No., term of validity, replenishment amount and inventory amount. Upon reading of a JAN code put on a medicine box or a phial code put on a phial with the barcode reader 7, a medicine name read from the medicine master is displayed in the medicine column. The columns of the lot No., the term of validity and the replenishment amount are used for inventory management. In this case, the replenishment amount is automatically captured from a weighed value or a value can manually be inputted.

Upon click-operation of the setting, a pull-down menu composed of dispensing setting, print setting, sound setting and dose inputted is further displayed.

Upon click-operation of the dispensing setting, the screen is changed to a dispensing setting screen, where various settings can be made. Herein, four buttons from settings 1 to 4 are provided so that a number of settings can be made in a narrow screen. For example, operating the setting 1 makes it possible to set whether or not excipient processing is performed, whether or not liquid medicines can be handled and the like. Operating the setting 2 makes it possible to set the display form when the number of days button is operated and the like. Consequently, by click-operation of the number of days button, a number of days selection screen shown in FIG. 9 is displayed to allow easy selection of the number of days. By these settings, operating the number of days button on the later-described inspection operation screen makes it possible to present an easy to select display. Operating the setting 3 makes it possible to set attribute clear, target value display color and the like.

In the sound setting, it becomes possible to easily set sound outputted when each screen is opened and when each button and the like are click-operated. As for important contents, such as error information, notifying the detailed contents by voice makes it possible to effectively prevent inspection mistakes from occurring. Moreover, it is also possible to associate each medicine stored in the master file with a sound file so that a pertinent medicine name is voiced during weighing operation.

Upon click-operation of the "dose inputted", the display is changed to "no dose inputted", and in this way, the display is switched by every click-operation. In the case where the "dose inputted" is selected and daily dose and the number of prescription days are inputted, it is determined whether or not the inputted daily dose is within an appropriate daily dose range stipulated by the upper limit value and the lower limit value of a daily dose registered in the medicine master. Further, in the case where the number of packs (the frequency of daily dosing) is inputted, it is determined whether or not the dose is within an appropriate one dose range stipulated by the upper limit value and the lower limit value of one dose. If the value is within the appropriate range, then the display is changed to the weighing confirmation screen, whereas if the value is out of the appropriate range, then error is notified. In the case where the medicine weighing device is network connected, the daily dose and the number of prescription days may be obtained through communication with a server to read the prescription data.

Moreover, based on the prescription data (prescription No.) selected by operation of the prescription No. button, a list of the names of medicine to be dispensed and their doses is displayed on the inspection operation screen. The doses are the prescribed doses of the medicines sited on the prescription slip. For example, in the case of prescribing a medicine A of 2 g per dose for a week, a value 14 g is displayed in the dose column. Upon click-operation of the item "target value", the display content is changed to an "actual measurement value", and the weight of one dose (2 g in the above example) is displayed. When the dose is displayed, the background color is changed. Herein, the background color is green. This enables dispensing staffs to easily recognize what is the displayed weight is about at a glance. Therefore, despite the limited narrow space, it becomes possible to achieve the display which is easy to see and free from mistakes.

By click-operating the menu button on the inspection operation screen and selecting the master maintenance, it becomes possible to register the specific gravity of medicine. More specifically, the screen is changed to a specific gravity input screen, where medicine is mounted on the scale table 2a.

For example, in the case where medicine to be mounted is a tablet medicine, inputting the number of tablets leads to automatic calculation and registration of the specific gravity, i.e., the weight of one tablet. Similarly, in the case of a heat seal tablet, the weight of one package (detachable smallest unit) is calculated and registered as the weight including a blister mount. In the case where medicine to be mounted is an external medicine, for example, in the case of a poultice, the weight of one poultice should be registered as the specific gravity as with the case of the tablet. As a result, even in the case of medicine other than powdered medicine, mounting a medicine on the scale table 2a allows accurate conjecture of its quantity.

Next, the name and the dose (target value) of medicine which is to be weighed are inputted in the medicine list. The medicine name and the dose may be inputted by displaying a virtual keyboard on the screen. It is also possible to read the prescription data from a server by inputting the prescription slip No. so as to automatically display the medicine list.

In this case, it is determined whether or not the dose is within an appropriate daily dose based on a recommended dose stored in the medicine master in the storage medium 11 (or a server), more specifically, based on an appropriate daily dose range stipulated by the upper limit value and the lower limit value of a recommended dose. If the dose is within the appropriate daily dose range, then the screen is changed to execute a recommended dose check operation as will be described later. If the dose is out of the appropriate daily dose range, then an error message is displayed to alert the dispensing staff.

In the meanwhile, what should be inputted onto the inspection operation screen is only those items that can be inputted thereon. As for the number of days, the number of packs, age and (the body weight), data sets of the inputted items are displayed on the buttons. This makes it possible to easily recognize the presence and absence of the data in each item and its value. In the following processing, even if there are items which are not inputted, the recommended dose check processing is executed based only on the inputted items as described later.

When input operation on the inspection operation screen is finished, a phial (vial) containing medicine to be dispensed is selected by a dispensing staff based on the contents of a prescription slip, and a barcode stuck to the vial is read with the barcode reader 7 (step S4), so that it is determined whether or not the inputted medicine name and the medicine name read with the barcode reader 7 match. If they do not match, then the medicine to be weighed is wrong, and therefore a warning message is displayed on the screen as shown in FIG. 12 to notify the dispensing staff of the error. In this case, highlighting the error screen in red enables the dispensing staff to recognize the mistake of the medicine at a glance. If the medicines match, then the display in the display section 3 is changed from the inspection operation screen to a weighing screen shown in FIG. 8 (step S5).

In the case where the setting is operated in the menu on the inspection operation screen so that the daily dose set is selected, the weighing confirmation screen shown in FIG. 10 is temporarily displayed before the display is changed to the weighing screen. Displayed on the weighing confirmation screen are medicine related information such as medicine names and their doses, the number of prescription days, usage, age, the body weight as well as a daily dose and a target total dose. It is possible to set so as not to display the target total dose. This helps to prevent careless mistakes by letting the dispensing staff to calculate the target total dose for exercise of his/her brain.

On the weighing screen, a medicine name, which is searched in the database based on the read barcode and is extracted therefrom, is displayed on an item "medicine name (1: encircled in the drawing)". In this case, the display form is differentiated depending on the type division of medicine. For example, common drugs are displayed in black, and other drugs are displayed in red. The type division is displayed at the head of the medicine name. Further, in the case of medicine with toxicity, a character (toxic) is presented before the medicine name, and the displayed medicine name is displayed in red and the like. This makes it possible to call attention to dispensing staffs in handling of the medicine to be dispensed.

In an item "check method (2: encircled in the drawing)", specified display is made in the case where checking is performed when the weighing conditions are in an inputting state, i.e., when inputs of the weighing conditions are insufficient. Herein, in the case where any one of "number of days", "number of doss", "age, and "body weight", which represent attribute, are not inputted, a character (reference) is displayed. Moreover, when a recommended dose for patients under 15 years old is not registered, a recommended dose calculated from the adult total dose by (Equation 1) by Augusberger method is used and a letter (A) is displayed. Further, in the case where patients are infants under 1 year old and their recommended dose is not registered, a value calculated from the adult total dose by (Equation 2) by Fried method is used as a recommended dose and a letter (F) is displayed.

$$\text{Recommended dose} = (\text{age} \times 4 + 20)/100 \times \text{adult dose} \quad \text{(Equation 1)}$$

$$\text{Recommended dose} = \text{age (month)} \times \text{adult dose}/150 \quad \text{(Equation 2)}$$

In an item "age (3: encircled in the drawing)", the age of a patient is displayed, while in the case of displaying an adult dose data as reference display, adult is displayed.

In an item "recommended dose unit (4: encircled in the drawing)", display is made so that it can be understood that in what kind of unit the recommended dose is displayed. For example, in the case of internal medicine, one day is displayed, while in the case of single use medicine and external medicine, one time is displayed.

In an item "recommended dose display form (5: encircled in the drawing)", a character representing what basis a displayed recommended dose is determined on is displayed. A character (total) represents a total amount, a character (weight) represents a total amount calculated by body weight, and a character (means) represents a total amount calculated by the mean weight of adults.

In an item "recommended dose (6: encircled in the drawing)", an amount of medicine which is expected to offer a therapeutic effect when the medicine is used in the most general way is displayed. Used for the recommended dose are data sets of lower limit and upper limit of age, division, contraindication, one time upper limit and lower limit, and daily lower limit and upper limit inputted corresponding to a medicine name inputted on the recommended dose register screen. In a "lower limit and upper limit of age" line, the lower limit amount and upper limit amount administrable by age are inputted. In a "division" line, a character "Kg" representing an amount per 1 kg of body weight or a character "total" representing an amount for the entire body weight are inputted. In a "contraindication" line, a contraindication division is inputted. In a "one time lower limit and upper limit" line, one time is inputted, while in a "daily lower limit and upper limit" line, the lower limit amount and upper limit amount for daily dose are inputted.

It is to be noted that upon selection of any one of the item "check method (2: encircled in the drawing)" to the item "recommended dose (6: encircled in the drawing)", a lit of recommended doses of selected medicine corresponding to respective items as in the recommended dose register screen shown in FIG. 11 is displayed for allowing reference.

In an item "notice (7: encircled in the drawing)", notices in handling the medicine, which are stated in a remark column in the medicine master, are displayed.

In an item "range (8: encircled in the drawing)", a smallest unit which can be displayed in the number of display digits set in the "RANGE" button is displayed. In FIG. 8, a value of 100 mg is displayed, and since the unit g is displayed in the weighing frame, a value is displayed to the first decimal place.

In an item "tracking (9: encircled in the drawing)" a message "TRACKING ON" is displayed when tracking is in ON state by operation of the "stabilize" button.

In an item "stabilized mark (10: encircled in the drawing)", a symbol "→" is displayed when the weighing state is stabilized. In this case, the stabilized state may be notified through a voice guide, buzzer sound and the like.

In an item "zero-point display (11: encircled in the drawing)", numeral "0" is displayed when the weighed value is in the vicinity of zero point, i.e., generally 0 kg.

In an item "weighing unit (13: encircled in the drawing)", a unit appropriate for a medicine to be weighed is displayed. For example, in the case of powdered medicine, a unit "g" or "mg" is displayed, while in the case of liquid medicine, a unit "ml" is displayed. In the case of the liquid medicine, a result obtained by converting a weighed weight to a capacity based on a registered specific gravity is displayed in the weighing frame. It is to be noted that in the case of tablet medicine, i.e., in the case where the medicine type in the medicine master is "tablet (unit)", a weighed result is displayed not as weight or capacity but as the number of units. In this case, data on one tablet, which is obtained by measuring the weight of a plurality of tablets and dividing the weight by the number of the tables, is stored in the medicine master. Consequently, error is suppressed compared to the case where one tablet is measured individually. In registering data in the medicine master, register buttons such as "tablet 10" and "tablet 20" should be displayed, and the specified number of tablets (herein 10 or 20 tablets) should be mounted on the scale table 2a for measurement. Thus, registration of the weight per unit for the tablet medicine is completed.

Upon touch-operation of the "stabilize" button, it becomes possible to set a stability factor, presence and absence of structure by temperature, and tracking on and off. Upon touch-operation of the "CAL" button, calibration of the scale can be executed. Upon touch-operation of the "RANGE" button, it becomes possible to change a weighable range, i.e., the number of decimal places to be displayed after the decimal point. Upon touch-operation of the "tare" button, it becomes possible to change the zero point setting depending on whether or not the tray is mounted on the scale table 2a. Upon touch-operation of the "expand" button, a weighed value displayed in the weighing frame can be displayed up to one decimal place smaller for a specified time (herein for 10 seconds). Upon touch-operation of the "cancel" button, weighing operation is cancelled. Upon touch-operation of "determine" button, the weighing operation is terminated, and a weighed value is obtained as a final stabilized value.

Figure 22:
FIG. 22 is a view showing another example of the weighing screen displayed in the display section in FIG. 1.
Figure 23:
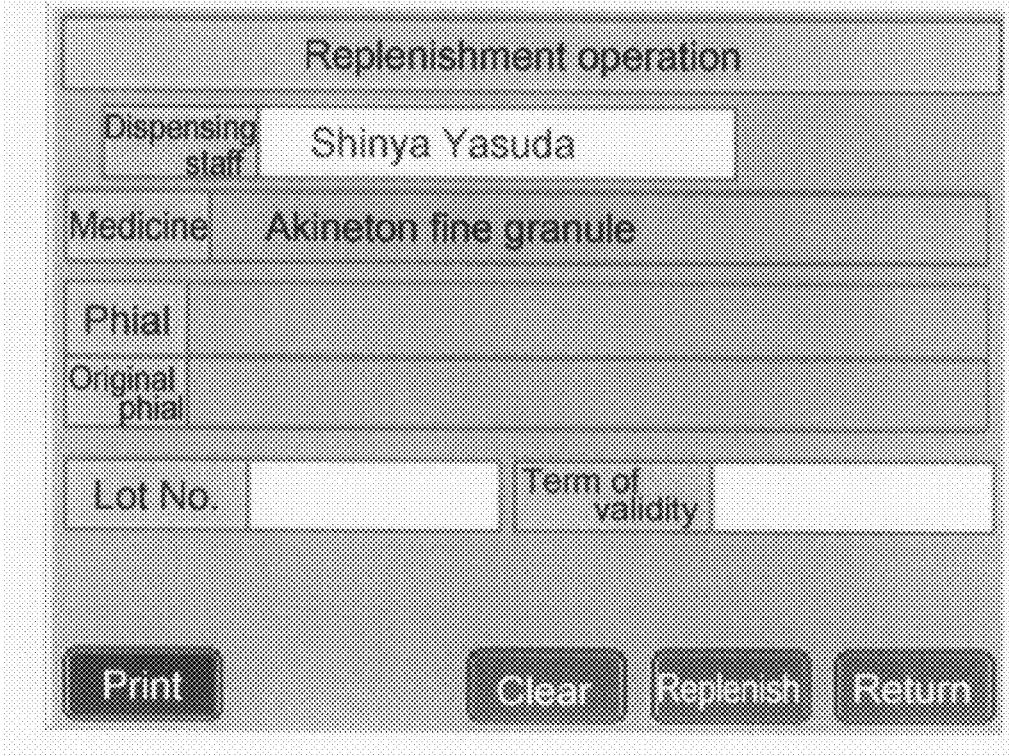
FIG. 23 is a view showing the replenishment operation screen changed by operation of a replenish button in FIG. 22.

It is to be noted that it is possible to structure the weighing screen to have a replenish button so as to be able to display a target value as shown in FIG. 22. Upon click-operation of the replenish button, the display is changed to the replenishment operation screen shown in FIG. 23. The replenishment operation screen has almost an identical structure to that shown in FIG. 21, in which columns of dispensing staff, medicine, phial, original phial, Lot No., and term of validity are displayed. Since the replenishment is executed during weighing operation (refilling of medicines), the name of medicine under weighing (Akineton fine granule displayed on the weighing screen in FIG. 22) is displayed in the medicine column. Then, the barcode on a phial (vial) containing the medicine to be replenished or the barcode on an original phial which contained the replenished medicine is read with the barcode reader so as to determine whether or not the read medicine name matches the medicine name displayed in the medicine column. If they match, a matching message is displayed before the screen returns to the weighing screen in FIG. 22. If they do not match, then an error message is displayed and the device is on standby for re-reading of the barcode. It is to be noted that FIG. 23 shows the screen displayed during weighing operation, in which it is based on the premise that the medicine under weighing operation is not present, and therefore the replenishment amount and the inventory amount columns as shown in FIG. 21 are not displayed.

Based on the prescribed dose prescribed in a prescription slip, medicine (housed in a tray) is mounted on the scale table 2*a* and weighing is started with the weighing screen being displayed. In this case, the perimeter is covered with a windshield cover to remove an influence of an air flow if necessary. As the medicine is gradually mounted on the scale table 2*a*, the weight during weighing is displayed in the weighing frame, while at the same time, an actual measurement bar corresponding to the weight during weighing is displayed in the weighing bar in a different color. The dispensing staff can perform weighing operation while sensuously recognizing how much medicine should be added based on the change in the length of the actual measurement bar. When a weighing value reaches a weighing error range (when a weighing value reaches the vicinity of a target value line representing a target value set in some midpoint of the weighing bar), the actual measurement bar changes its color to notify the dispensing staff of appropriate weighing of the medicine. In this case, notification by sound is preferable.

Figure 13:
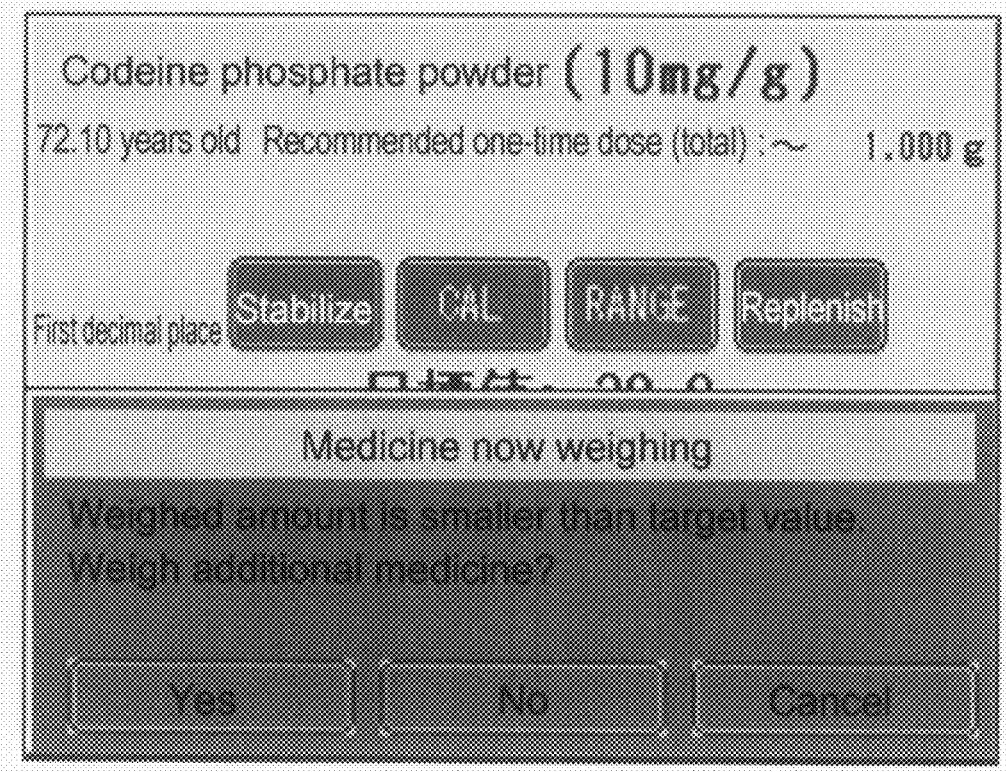
FIG. 13 is a view showing the inspection operation screen displayed in the display section in FIG. 1 with a warning message indicating that a weighed value is smaller than a target value.
Figure 14:
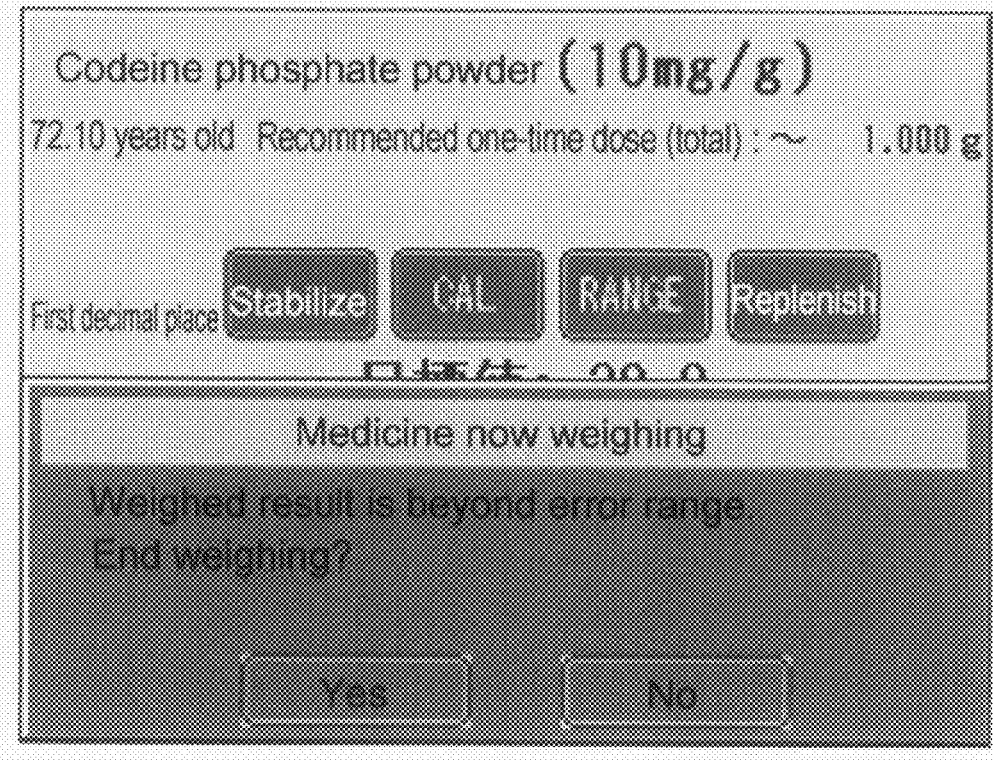
FIG. 14 is a view showing the inspection operation screen displayed in the display section in FIG. 1 with a warning message indicating that a weighed value is larger than a target value.

When the weighing state is stabilized (step S6), the weighing stabilized mark "→" is displayed on the left side of the weighing frame (step S7). The background color of the weighing frame is also changed. The display is maintained as long as weighing is executed in a stabilized state. In the case where the weighing state is stabilized even though a weighed value is out of the weighing error range (or in the case where a specified time has passed after the weighing state is stabilized, in the case where the determine button is operated, or in the case where a specified time has passed after the tray housing the medicine is removed from the weighing scale table 2*a*), the following warning message is displayed. That is, if the weighed value is below than the weighing error range, a warning message shown in FIG. 13 is displayed, while the weighed value is above the weighing error range, a warning message shown in FIG. 14 is displayed. When the former warning message is displayed, the "yes" button is operated to perform additional processing of medicine, the "NO" button is operated to cancel the weighing operation, or the "cancel" button is operated so as to return the screen to the weighing screen to check the displayed contents. When the latter warning message is displayed, the "yes" button is operated to cancel the weighing operation, or the "no" button is operated to continue the weighing operation. This course of action is taken when the weight of medicine which should be weighed is beyond the maximum weighable value of the medicine weighing device. For example, when the weighable maximum value is 15 g and the weight of medicine which should be weighed is 17 g, first the maximum value of 15 g should be weighed so as to let the warning message in FIG. 14 be displayed, and then the "no" button should be operated to weigh the remaining 2 g.

After that, when a specified time has passed after the determine button is operated or the tray housing the medicine is removed from the scale table 2*a* (step S8), a value displayed in the weighing frame is captured as a final stabilized value, i.e., a weighed value (step S9), and recommended dose check processing as described below is executed (step S10).

In the recommended dose check processing, data relating to the recommended dose read when the barcode was read and the database (medicine data) was searched in the step S4 is used.

Figure 4:
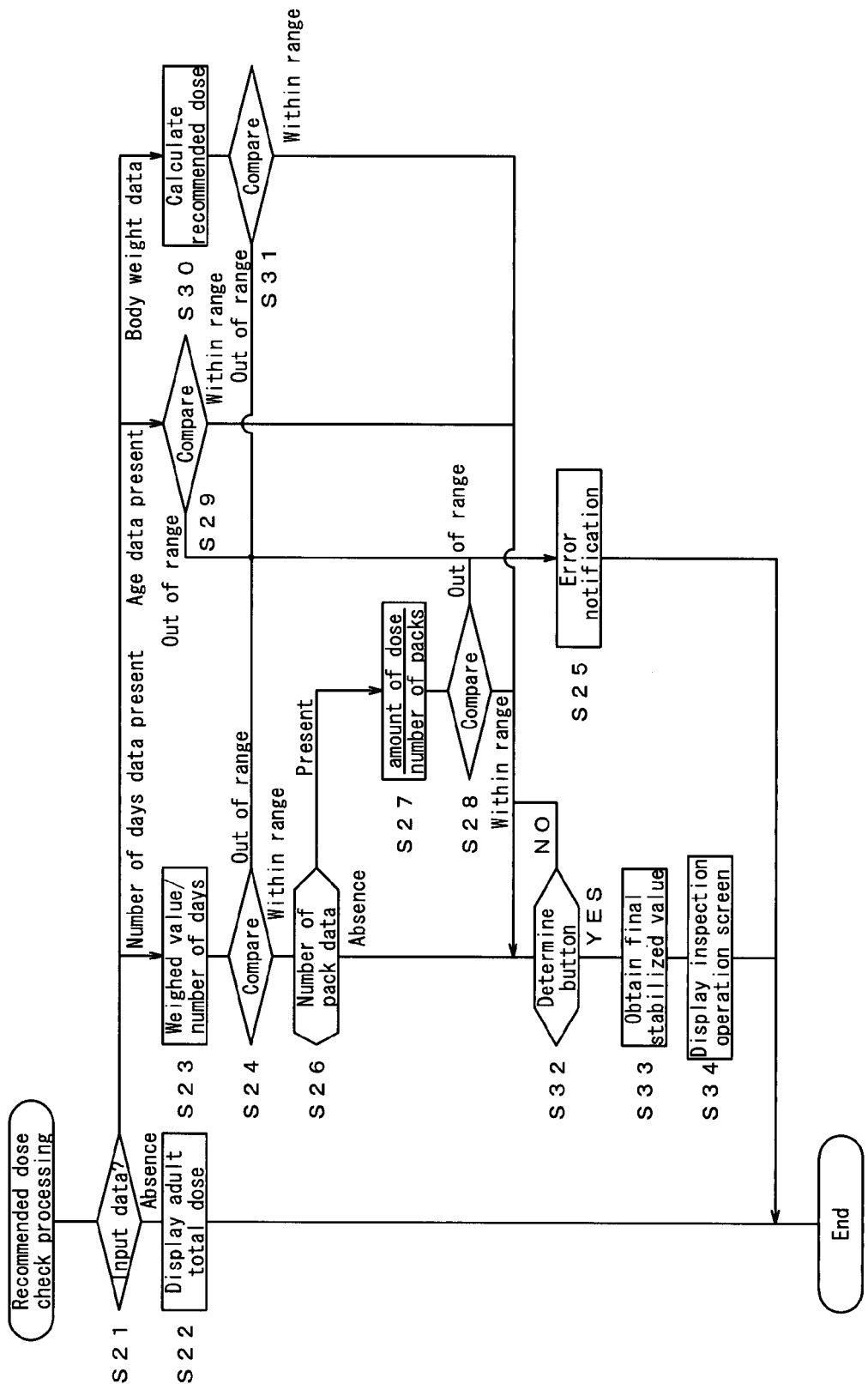
FIG. 4 is a flowchart showing recommended dose check processing in FIG. 3.

As shown in the flowchart in FIG. 4, it is first determined whether or not the data, which was obtained by input operation after operating the buttons of "number of days", "number of packs", "age", and "body weight", is in the medicine master (step S21). If any data is not present, the adult total dose specified by the medicine name is displayed in the recommended dose column as a reference value (step S22). Herein, the adult total dose refers to a daily total dose of the medicine which can be administered to adults. In this case, a character (reference) is displayed in an item "check method (2: encircled in the drawing)", and the recommended dose check is not executed. In other words, only the weighing operation is executed.

When only the data on the number of days, that is the number of prescription days, is inputted, the weighed value is divided by the number of days (step S23) to calculate a daily prescribed dose. Then, the prescribed dose and the daily recommended dose for adults (lower limit value to upper limit value) read in the step S4 are compared (step S24). If the prescribed dose does not reach the range of the recommended dose, the display is changed to an error screen (step S25). In this case, the error may be notified by the speaker. This makes it possible to reliably notify the necessity of taking action such as consulting with doctors.

When the data on the number of packs, that is the frequency of daily dosing, is inputted (step S26) in addition to the number of days data, the prescribed dose calculated in the step S23 is further divided by the number of packs to calculate one dose (step S27). In this case, the weight of a wrapping paper (medicine wrapper) for wrapping the medicine should be considered. Then, the calculated dose and the recommended one-time dose (lower limit value to upper limit value) for adults read in the step S4 are compared (step S28). As a result, if the dose is not in the recommended dose range, then the display is changed to the error screen as in the above case (step S25). If the recommended one-time dose for adults is not registered in the medicine data, then this processing is not executed.

If the age data is inputted, then the calculated dose is compared to the recommended dose falling in the matching age band among each data set read in the step S4. In this case, the data for comparison is different depending on whether only the number of days data is inputted or the number of packs data is further inputted. In the case where the recommended dose corresponding to age is not registered, a value obtained by calculation based on (Equation 1) is used as a recommended dose for patients under 15 years old, whereas a value obtained by calculation based on (Equation 2) is used as a recommended dose for patients under 1 year old. If the dose is not in the range of the recommended dose, the display is changed to the error screen as in the above case (step S25).

When the body weight data is inputted, the data set in which the unit "kg" is displayed in the "division" line among the data sets read in the step S4 is referred. Then, the registered recommended dose is multiplied by the inputted body weight to obtain a recommended dose according to the body weight (step S30). Upon obtaining the recommended dose for the body weight, it is then determined whether or not the weighed value is in the range of the recommended dose (step S31), and if the weighed value is not in this range, then the display is changed to the error screen as in the above case (step S25).

Thus, if the weighed value is in the range of the recommended dose as a result of executing the recommended dose check based on the inputted weighing conditions, then the "determine" button (15: encircled in the drawing) is touch-operated (step Carbons 32) so as to cancel the weighing operation to obtain a final stabilized value (step S33). Then, the display is changed to the inspection operation screen, where a list of weighed medicines and their actual measurement values is displayed (step S34). In this case, it is preferable to voice the confirmed medicine names so that the dispensing staff can re-confirm the medicines in an acoustic way.

It is to be noted that when both the age data and the body weight data are inputted, the recommended dose check by the body weight data is executed.

When a series of weighing processes is finished in the above described manner and another medicine to be weighed is present for the same patient, the patient data continues to be displayed on the weighing screen in the case where the attribute clear is set to "no" on the dispensing setting screen, though the weighed value and the like are cleared upon finalization of the weighed value. Therefore, without the necessity of inputting the patient data, the dispensing staff can continue to perform weighing operation.

(Excipient Processing)

In the meanwhile, in the recommended dose check processing, when automatic excipient processing is set, a reference amount stored as excipient data and a weighed value based on the prescribed dose are compared, and if the prescribed dose is below the reference amount, then the excipient processing is executed.

More specifically, in the case where actual measurement values for a plurality of types of medicine and their total value are displayed on the inspection operation screen shown in FIG. 6 and a value obtained by dividing the total value by the number of days is below the reference amount, then the medicine is subject to the excipient processing.

The automatic excipient processing is set by selecting "yes" in a setting item "automatic excipient processing executing upon registering" and is started upon selection of the register button. In the case where "no" is selected, the excipient processing is not executed and data is registered without further processing while a message indicating that the medicine is not subject to excipient processing is displayed.

In the excipient data, "reference amount" and "fixed excipient amount" can be set by difference of "age" and "division" on the excipient processing method register screen shown in FIG. 15. In the "age", the target age requiring excipient medicine is inputted. The "division" stipulates the excipient processing method, in which a character (reference) refers to "reference amount" excipient processing method and a character (fixed) refers to "fixed amount" excipient processing method as described later. The "reference amount" excipient processing method and the "fixed amount" excipient processing method have reference values, i.e., critical values determining whether or not excipient processing is executed, the reference values being different between the case of "one pack" and the case of "two or more packs". The "one pack" refers to "one pack per day", while the "two or more packs" refers to dividing a daily dose into two or more doses (packages). For example, in the case of "two packs for three days", the total administration amount is six packs, so that the determination whether the medicine is subject to excipient processing is made by comparing a value obtained by dividing a weighed medicine value by six and the "reference value for two or more packs". Herein, the reason why different reference values are set for the "one pack" and "two or more packs" is to prevent the daily total consumption of excipients from becoming excessive due to executing the excipient processing using the reference value for the "two or more packs" which is identical to that for the "one pack".

In the excipient processing, when a plurality of types of excipients are set, a list thereof is displayed on the excipient medicine selection screen so that an excipient is selected therefrom. Upon specification of the excipient, medicine authentication processing is executed, and then the display is changed to the excipient processing screen to start weighing. In the case where only one type of excipient is set, the selection processing is skipped and the operation shifts to the next medicine authentication processing.

In the medicine authentication processing, excipient data shown in FIG. 16 is referred by reading the barcode on a phial with the barcode reader so as to determine whether or not the read excipient is a matching excipient. If it is not a matching excipient, then a message "wrong medicine" is displayed. If it is the matching excipient, then the display is changed to the excipient screen shown in FIG. 16.

In the case of excipient processing method "by age", a reference value is determined based on an inputted age, and based on this reference value, whether or not excipient processing is executed is determined. The reference value is also determined depending on whether "reference amount" excipient processing method is used or the "fixed amount" excipient processing method is used. In an example in FIG. 15, in the case of patients under 15 years old, the reference value is determined by the "reference amount" excipient processing method. In the case of "one pack", the reference value is 1.00 g, while in the case of "two or more packs", the reference value is 0.8 g, and if the weight of medicine to be prescribed is lower than this value, then the excipient processing is executed.

On the excipient processing screen, as shown in FIG. 16, the name of an excipient is displayed on the upper section, and a target value (herein 2.7 g) of the excipient is displayed above the weighing frame. Below the weighing frame, a bar-like meter section is displayed for showing a reference amount. In the meter section, a region indicating the weighed value of a medicine is secured on the right side, while a region of the excipient during weighing is displayed from the left side. Since the excipient can be added while the dispensing staff looks at the display of the meter section, the meter section can be used as a guidepost to attain the reference value by adding the excipient to the medicine, and this provides good workability. In the case of the "fixed amount" excipient processing method, a fixed amount is displayed, and therefore the excipient should be added so as to reach the fixed amount. In this case, when a weighing result reaches a target value, it is preferable to notify it by buzzer sound and the like.

It is to be noted that on the inspection operation screen, touch-operation of a total button makes it possible to start the excipient processing when the total weighed value does not reach the reference amount even though of the automatic excipient processing is set.

When a plurality of types of medicine are mixed for dispensation, weighing can be continued in sequence till the "register" button is operated on the inspection operation screen. Every time the weighing operation is completed (every time the "determine" button is touch-operated in the step S32), the name of the medicine and its actual measurement value (weighed value) are added to the list displayed on the inspection operation screen. In the case of mixing powdered medicine and liquid medicine, the incompatibility registered as the medicine date should preferably be taken into consideration.

Moreover, when the result of recommended dose check is obtained, touch-operation of the "print button" on the inspection operation screen makes it possible to print the result with the printer 6. It is to be noted that the number of copies to be printed may be changed in response to the number of the touch operation of the print button. Herein, three modes, no print, print present, and two print (printing two copies), can be selected. It is also possible to automatically determine the presence of the data for printing and not to executed printing when no data is present.

The contents of the recommended dose check result are stored in the storage medium 11 regardless of whether the result is actually printed or not, so that who dispensed what medicine can be checked later.

Further, when the barcode of a phial containing the medicine which has already been weighed is read again, an addition and re-weighing screen (not shown) is displayed, so that either the addition and re-weighing or cancellation can be selected to execute selected processing. In the case of the addition, a weighed value with a new weight added to the already registered weight is re-displayed. In the case of re-weighing, the weighed value is cleared and a new weighed value is re-displayed. In the case of the cancellation, that is, in the case where the barcode of the phial is read again by mistake, the display returns to the inspection operation screen.

(Another Embodiment)

In the above embodiment, only the data on the medicine to be handled is extracted from the medicine master and stored in the storage medium 11 as the data on adopted medicine. However, in the case of medicine that is not adopted, the medicine data is found to be unregistered when its barcode is read with the barcode reader, a medicine master stored in the server may be referred through a network so as to execute the recommended dose check processing. In this case, it is preferable to flash a specified section (e.g., medicine name) on the weighing screen so as to notify that the device is now communicating with the server. In the case of medicine which is also unregistered in the medicine master, the medicine may temporarily be registered as unregistered medicine so that the dispensing inspection, i.e., the recommended dose check processing can be executed.

(Synchronization with Host System)

Although in the above embodiment, the specific gravity for every medicine can be registered in the medicine master, it is preferable that which data sets to be used, among the data sets registered on the side of the medicine weighing device, can be selected. For example, modes such as powdered medicine, liquid medicine, external medicine and heat tablet should be formed, and based on the selected mode, the calculation method for the specific gravity of medicine should be changed.

While in the above embodiment, description has been provided of the point that the inspection check can also be executed by mounting the storage medium 11 on the device, the device can only perform weighing of medicine as a general scale in the case where the storage medium 11 is not mounted. More specifically, the device should be structured so that the members encircled by a broken line in FIG. 2 function as a general scale and that the calculation method is satisfied only by these members. Version upgrade of the inspection system becomes possible simply by changing the program stored in the storage medium 11. In other words, it is not necessary to take a test again to prove that the section functioning as a scale satisfies the Measurement Law.

Although in the above embodiment, the USB memory is connected as the storage medium 11, it is also possible to connect a flash memory (e.g., USB memory) in addition to the storage medium 11 so as to back up the data stored in the storage medium 11. The backup operation should automatically be executed when the medicine weighing device is started up.

Although description has been given of the case where medicine is housed in the tray mounted on the scale table 2a for weighing in the above embodiment, it is also possible to form a readout target section such as barcodes and IC chips on the tray. More specifically, in the case of the barcode, it should correspond to medicine to be housed, while in the case of the IC chip, information on the medicine to be housed should be written thereon. For example, in the case where medicine (powdered medicine) housed in the tray is divided into portion packs by a portion packing machine for powdered medicine, it is preferable to obtain medicine information by reading the readout target section provided on the tray and to automate the portion packing operation with the portion packaging machine for powdered medicine.

The invention claimed is:

1. A medicine weighing device comprising:
   weighing means for weighing medicine;
   display means for displaying a weighed value and a number of weighing conditions;
   input means for inputting the weighing conditions;
   storage means for storing medicine data including the weighing conditions of the medicine, a recommended dose to satisfy the weighing conditions and a daily dose of medicine which can be administered to adults stipulated by a medicine name as an adult total dose; and
   control means for recalling the recommended dose stored in the storage means based only on the weighing conditions that are inputted by the input means from among the weighing conditions, and displaying the recommended dose and a weighed value of the medicine which was weighed by the weighing means on the display means while executing a recommended dose check, and, when no weighing condition is inputted by the input means, the control means displays the adult total dose stored in the storage means as a reference value together with the value weighed by the weighing means on the display means,
   wherein the weighing means, display means, input means, storage means, and control means are provided in a device main body.

2. The medicine weighing device according to claim 1, comprising a medicine determination means for determining the medicine, wherein upon determination of the medicine by the medicine determination means, the control means allows weighing by the weighing means.

3. The medicine weighing device according to claim 1, wherein the storage means stores a daily recommended dose of the medicine as the medicine data, and when a number of prescription days of the medicine is inputted as a weighing condition by the input means, the control means divides the weighed value by the weighing means by the number of prescription days to calculate a daily prescribed dose and compares the resultant daily prescribed dose with the daily recommended dose of the medicine stored in the storage means so as to execute a recommended dose check.

4. The medicine weighing device according to claim 3, wherein the storage means further stores recommended one-time dose of the medicine as the medicine data, and when a number of divided packs is further inputted as a weighing condition by the input means, the control means divides the daily prescribed dose by the number of packs to calculate one time prescribed dose and compares the resultant prescribed dose with the recommended one-time dose stored in the storage means so as to execute a recommended dose check.

5. The medicine weighing device according to claim 1, wherein the storage means stores data allowing calculation of a recommended dose for different body weights as a weighing condition of the medicine data, and when the body weight is inputted by the input means as a weighing condition, the control means calculates a recommended dose based on the body weight with reference to the data stored in the storage means and compares the resultant recommended dose with a weighed value by the weighing means so as to execute a recommended dose check.

6. The medicine weighing device according to claim 1, wherein the storage means stores a recommended dose for different ages as a weighing condition of the medicine data, and when the age is inputted as a weighing condition by the input means, the control means calls the recommended dose stored in the storage means based on the age and compares the resultant recommended dose with a weighed value by the weighing means so as to execute a recommended dose check.

7. The medicine weighing device according to claim 1, wherein the medicine to be dispensed is identified by reading a reading target section provided on a container for containing medicine with read means, and the control means identifies the medicine not only when the medicine is a registered medicine stored as the medicine data in the storage means but also when the medicine is an unregistered medicine obtained through a connected server.

8. The medicine weighing device according to claim 7, wherein the control means can temporarily register an unregistered medicine which is not registered in the server for identification of the medicine.

9. The medicine weighing device according to claim 2, wherein the storage means stores data allowing calculation of a recommended dose for different body weights as a weighing condition of the medicine data, and when the body weight is inputted by the input means as a weighing condition, the control means calculates a recommended dose based on the body weight with reference to the data stored in the storage means and compares the resultant recommended dose with a weighed value by the weighing means so as to execute a recommended dose check.

10. The medicine weighing device according to claim 2, wherein the storage means stores a recommended dose for different ages as a weighing condition of the medicine data, and when the age is inputted as a weighing condition by the input means, the control means calls the recommended dose stored in the storage means based on the age and compares the resultant recommended dose with a weighed value by the weighing means so as to execute a recommended dose check.

11. The medicine weighing device according to claim 2, wherein the medicine to be dispensed is identified by reading a reading target section provided on a container for containing medicine with read means, and the control means identifies the medicine not only when the medicine is a registered medicine stored as the medicine data in the storage means but also when the medicine is an unregistered medicine obtained through a connected server.

12. The medicine weighing device according to claim 11, wherein the control means can temporarily register an unregistered medicine which is not registered in the server for identification of the medicine.

* * * * *